US011238425B2

(12) United States Patent
Chandran (10) Patent No.: US 11,238,425 B2
(45) Date of Patent: Feb. 1, 2022

(54) API SERVER AND METHOD OF USAGE THEREOF

(71) Applicant: NCR Corporation, Atlanta, GA (US)

(72) Inventor: Rohith Krishnan Pradeep Chandran, Thrissur (IN)

(73) Assignee: NCR Corporation, Atlanta, GA (US)

( * ) Notice: Subject to any disclaimer, the term of this patent is extended or adjusted under 35 U.S.C. 154(b) by 139 days.

(21) Appl. No.: 16/199,691

(22) Filed: Nov. 26, 2018

(65) Prior Publication Data
US 2020/0167750 A1   May 28, 2020

(51) Int. Cl.
| G06Q 20/20 | (2012.01) |
| G06Q 20/08 | (2012.01) |
| H04L 29/08 | (2006.01) |
| G06F 9/54  | (2006.01) |
| G06Q 30/02 | (2012.01) |

(52) U.S. Cl.
CPC ........... *G06Q 20/202* (2013.01); *G06F 9/541* (2013.01); *G06F 9/547* (2013.01); *G06Q 20/085* (2013.01); *G06Q 30/0226* (2013.01); *H04L 67/02* (2013.01)

(58) Field of Classification Search
CPC ........ H04L 67/02; H04L 63/10; H04L 67/42; H04L 67/306; G06Q 20/102; G06Q 10/10; G06Q 20/123; G06Q 20/22; G06Q 20/3821; G06Q 20/08
USPC .......................................................... 705/21
See application file for complete search history.

(56) References Cited

U.S. PATENT DOCUMENTS

| 8,666,804 | B2* | 3/2014  | Barnes, Jr. ........ | H04M 1/72519 |
|           |     |         |                     | 705/14.1 |
| 9,154,315 | B2* | 10/2015 | Allen ................. | G06Q 10/0639 |
| 9,485,248 | B2* | 11/2016 | Schmoyer ............ | G06F 21/335 |
| 9,851,952 | B2* | 12/2017 | Rodrigues ............... | H04L 67/02 |
| 10,410,481 | B2* | 9/2019 | Yu ............................. | G07G 1/12 |
| 2002/0124170 | A1* | 9/2002 | Johnson, Jr. ........ | G06F 21/6218 |
|           |     |         |                     | 713/176 |
| 2007/0276824 | A1* | 11/2007 | Bashir ..................... | H04L 67/02 |
| 2015/0081462 | A1* | 3/2015 | Ozvat .................... | G06Q 20/40 |
|           |     |         |                     | 705/21 |
| 2015/0339648 | A1* | 11/2015 | Kushevsky ............ | G06Q 20/32 |
|           |     |         |                     | 705/21 |
| 2015/0379550 | A1* | 12/2015 | Warner .............. | G06Q 30/0238 |
|           |     |         |                     | 705/14.33 |
| 2016/0034876 | A1* | 2/2016 | Speiser ................ | G06Q 20/223 |
|           |     |         |                     | 705/21 |

(Continued)

OTHER PUBLICATIONS

Oracle Communications Services Gatekeeper, Application Developer's Guide, Release 6.0 (Apr. 2015)(hereinafter referred to as "Oracle").*

*Primary Examiner* — Peter Ludwig
(74) *Attorney, Agent, or Firm* — Schwegman, Lundberg & Woessner (57) ABSTRACT

A system, method and software using a common language-independent interface to interact with multiple hosts are generally described. POS terminals and ICRs interact with a PMI acting as a payments API server. The PMI contains rest-based APIs that are able to respond to HTTP requests for transactional and testing purposes. The PMI communicates with EPS in an EPC interact with an epsilon interface to process transactions and interact with payment hosts, a sigma interface to process loyalty transactions and interact with loyalty hosts and a POSCache interface to interact with pinpads.

9 Claims, 3 Drawing Sheets

(56) References Cited

U.S. PATENT DOCUMENTS

| | | | |
|---|---|---|---|
| 2016/0125376 A1* | 5/2016 | Beatty | G06Q 20/204 |
| | | | 705/72 |
| 2016/0267751 A1* | 9/2016 | Fulker | G08B 19/005 |
| 2016/0292660 A1* | 10/2016 | Yu | G07G 1/12 |
| 2019/0095892 A1* | 3/2019 | Jones | G06Q 30/0233 |
| 2020/0193408 A1* | 6/2020 | Hadley | G06Q 20/385 |

\* cited by examiner

API SERVER AND METHOD OF USAGE THEREOF

BACKGROUND

The use of electronic devices has increased astronomically in relatively recent history. Electronics are now ubiquitous in not only homes, but also in offices and commercial enterprises. For example, electronic point of sale (POS) terminals and Island Card Readers (ICRs) have been introduced in a variety of commercial enterprises, such as grocery stores, gas stations and the like. The POS terminals and ICRs may be connected to software that uses different generic interfaces for processing interactions with a variety of entities, including both local and remote hardware, as well as remote commercial enterprises. However, the interactions of a POS terminal and ICR among the various entities has used different individual software packages and interfaces. This may cause significant integration and interoperability issues between the software packages installed separately for the different interfaces, as well for clients having to install multiple pieces of software (and updates for each piece) at different times. It would be desirable to provide a standard interface for POS terminals and ICRs to enable easy integration for developers and clients.

SUMMARY

The present application generally describes a method of providing interactions with multiple different hosts associated with a transaction. POS terminals, ICRs and computers, among others, interact with the hosts via a language-independent payment messaging interface in a payments server that contains APIs. The hosts include payment hosts, loyalty hosts and pinpads. APIs are Representational State Transfer (REST)ful APIs that receive and respond to HyperText Transfer Protocol (HTTP) requests. The APIs are exposed for developers to provide testing of the server and access to interfaces to the hosts. The interfaces include an epsilon interface to process transactions and interact with the payment hosts, a sigma interface to process loyalty transactions and interact with the loyalty hosts, and a POSCache interface to interact with the pinpads.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
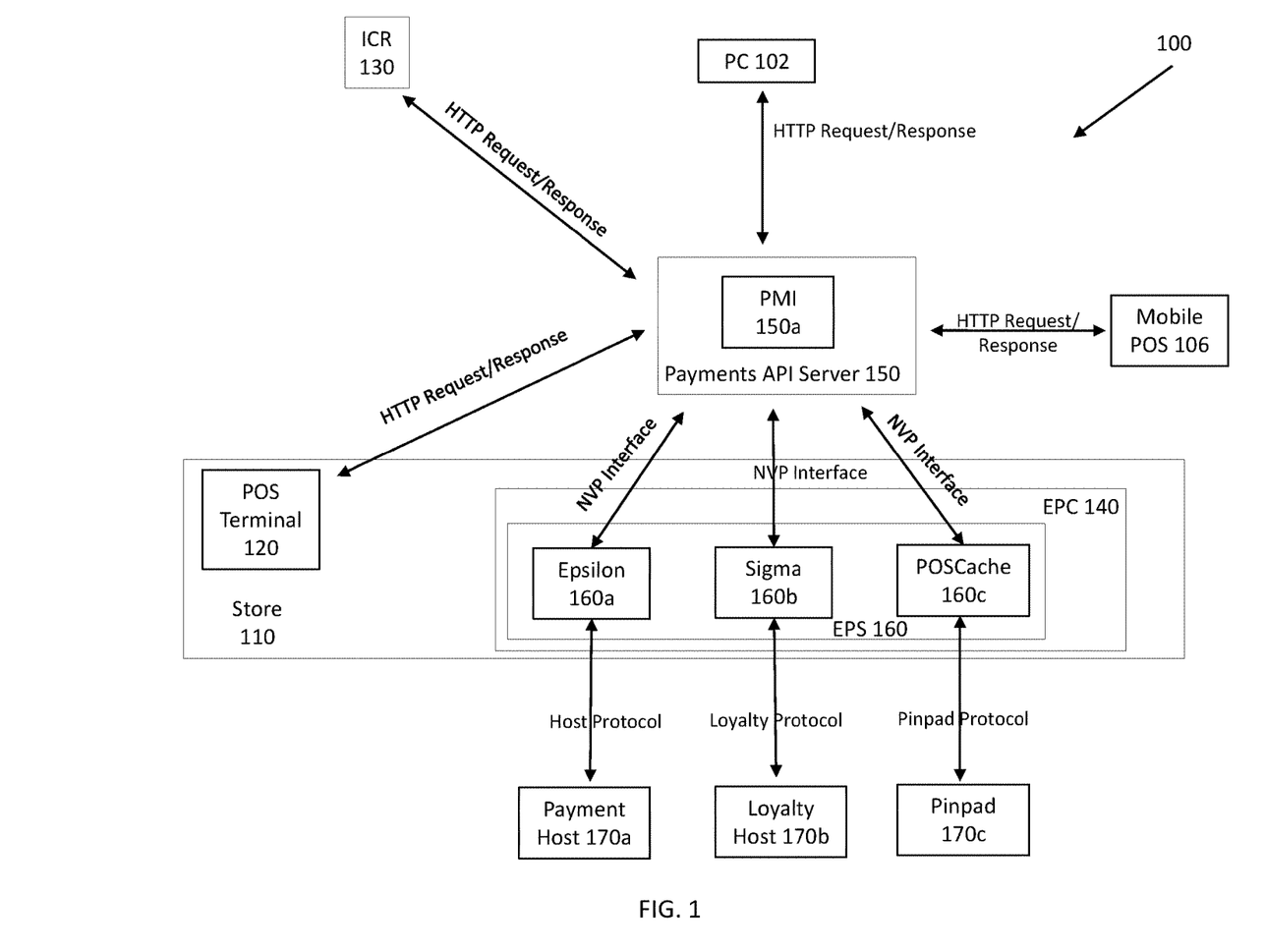
FIG. 1 illustrates one embodiment of a system according to one embodiment.

As above, a standard interface is provided for interactions of a POS terminal and an ICR among the various entities with which the POS terminal and ICR communicate to aid in interoperability and development of the electronic device containing the POS terminal or ICR, as well as reducing client-facing issues with handling multiple software packages within the POS terminal or ICR. FIG. 1 illustrates a system 100 offering a variety of services according to some embodiments. The system 100 of FIG. 1 includes communications for a POS terminal 120 and ICR 130 with various entities. The system 100 may include, as shown, one or more private entities such as a personal computer or other mobile personal communication device (e.g., smart phone) 102 operated by an individual, or one or more commercial entities, such as a mobile POS terminal 106, POS terminal 120 in store 110 or other commercial ventures or an ICR 130. The store 110 may be bricks-and-mortar type store, providing goods and/or services such as a supermarket or department/specialty store. The mobile POS terminal 106 may be, for example, carried around by employees in a supermarket, big box store, or restaurant, for example. Independent of the location of the POS terminals 106, 120, the POS terminals 106, 120 (and ICR 130/PC 102) may be configured interact with a payments API server 150. The payments API server 150 is shown in FIG. 1 as being remote from the POS terminals 106, 120 and ICR 130. However, in other embodiments, the payments API server 150 may be within a dedicated hardware device called an Electronic Payment Controller (EPC) 140 that is separate from the POS terminals 106, 120 and ICR 130. The EPC 140 may be located within the store 110 or may be remote from the store 110. Thus, in some embodiments the EPC 140 may be local to, e.g., the POS terminal 120 (i.e., within the same limited geographical area, such as a big-box store, accessible via a short range communications network such as WiFi).

The POS terminals 106, 120 may be configured to capture, for example, transaction information in the store 110. The transactional information may include specifics about a sale, such as an item of clothing and cost. In some embodiments, the POS terminals 106, 120 and ICR 130 may capture from a financial card, such as a credit, debit, or gift card or a mobile device, such as a smartphone (in other embodiments, financial card information may be captured by a pinpad 170c). The POS terminals 106, 120 may be automated, for example, an automated checkout line at a grocery store, or may be manned by an individual. The electronic financial transaction may be contactless, such as via near field communication (NFC) or optical character recognition (OCR), or may use a card reader or other mechanism to read a financial card. The POS terminals 106, 120 may thus obtain financial account-related information from the individual via one or more of a number of input mechanisms. Note that similar features may be enabled using the PC 102 or ICR 130, but, for the sake of convenience, only the POS terminals 106, 120 will be discussed.

Although not shown, multiple POS terminals may be present within the store 110. These POS terminals may communicate with each other directly or via an internal network (not shown). The POS terminals within the store may communicate, for example, via one or more micro, pico or nano base stations (BSs). The POS terminals may communicate with each other and external devices using any of a number of different techniques, such as WiFi, Bluetooth, Zigbee, or 3rd Generation Partnership Project (3GPP) network technologies, among others. The POS terminals 106, 120 and ICR 130 may also communicate via similar means, for example, the POS terminals associated with the chain of store or inside and outside a store (e.g., at a gas station) may communicate via the same mechanisms. The financial information obtained by the POS terminals 106, 120, for example, may include account number, individual identity, amount of transaction, and balance on card (if the card is a prepay or gift card, for example) among others.

After capture of the transaction information, the POS terminals 106, 120 and ICR 130 may transmit the captured information to the payment API server 150. The payment API server 150 may be installed locally, for example, in the EPC 140 or may be remote to the store 110 and the POS terminals 106, 120/ICR 130. The financial information may be transmitted by the POS terminals 106, 120 and ICR 130 to the payments API server 150 through an internal and/or external network, dependent on the location of the payments API server 150 relative to the POS terminals 106, 120 and ICR 130. The external network may be, for example, the internet or a private network (e.g., virtual private network (VPN)). Other equipment, such as base stations, routers, access points, gateways and the like used in communicating the financial information through the networks are not shown for convenience. The financial information may be encrypted using one or more of any of a number of encryption schemes. Such encryption may use strong encryption techniques, such as AES (128 bits and higher), TDES (minimum double-length keys), RSA (2048 bits and higher), ECC (160 bits and higher), and ElGamal (1024 bits and higher). Multiple levels of encryption may occur for the financial information, including both at the database level and at the application level, the latter of which may involve the use of an encryption library and a key retrieval service. The encryption keys may be different, for example, for different systems and payment hosts 170a and key exchange may occur as desired, e.g., on a per-transaction basis. The encryption may further be dependent on the transactional information or financial information. For example, purchase price or location may affect encryption or key exchange; e.g., a lower cost purchase such as a $20 purchase may have lesser encryption than a $500 purchase (or use different numbers of keys/authorizations) or a purchase from a particular store (such as a gas station) may have lesser encryption than from another store (such as an electronics store or store evidencing a higher fraud level), with both encryptions meeting a strong encryption standard.

The payments API server 150 may contain a Payment Messaging Interface (PMI) 150a that handles interactions for different requests and with different hosts. For example, after receiving the requests, the payments API server 150 may interact with different remote hosts (servers) 170a, 170b, 170c over different interfaces (software packages) 160a, 160b, 160c contained in an Electronic Payment Software (EPS) 160, for example. The EPS 160 may be contained within the EPC 140. Each of the interfaces 160a, 160b, 160c may communicate with their respective hosts 170a, 170b, 170c using different protocols. The different protocols may differ within the various hosts, such that, for example, different payment hosts 170a use different protocols. Thus, each interface 160a, 160b, 160c may have the flexibility to communicate using the different protocols.

In particular, as shown the epsilon interface 160a may be used to process credit/debit transactions and interact with payment hosts 170a, the sigma interface 160b may be used to process loyalty transactions and interact with loyalty hosts 170b, and the POSCache interface 160c may be used to interact with different pinpad model hosts 170c. The payments API server 150 and PMI 150a may interact with the payment hosts 170a, the loyalty hosts 170b, and the pinpads 170c through the same or different networks. For example, a payment host 170a may be a third party hosted system that processes and settles electronic tenders. The payment host 170a may act as an interface to issuers of a credit card, although there may be other intermediaries involved.

In particular, the epsilon interface 160a may be part of the EPS 160 that provides a generic interface to the POS terminals 106, 120 and ICR 130 for processing electronic payments with different payment networks. The epsilon interface 160a may be programmed to communicate with various proprietary payment networks on behalf of the POS terminal. Depending on the payment network, the epsilon interface 160a may be able to process credit cards, debit cards, gift cards, checks, etc. While the epsilon interface 160a may be installed, as shown, in the EPS 160, it may also be separated from the EPS 160 and reside in the POS terminals 106, 120/ICR 130, for example. In other embodiments, the epsilon interface 160a may be installed and run from other locations, such as the payments API server 150.

The sigma interface 160b may be part of the EPS 160 that provides a generic interface to the POS terminals 106, 120 and ICR 130 for processing loyalty transactions with different loyalty providers. Similar to the epsilon interface 160a, the sigma interface 160b may be programmed to communicate with various loyalty hosts (or networks) 170b on behalf of the POS terminal. The sigma interface 160b may be installed, in some embodiments, on the EPC 140 or in the system where the POS terminals 106, 120/ICR 130 reside. The loyalty hosts 170a may provide loyalty rewards to a user for use of a particular transactional device or for a transaction involving a particular store or item. The sigma interface 160b may thus be able to, for example, process loyalty credit cards like specific bank or airline credit cards, store-specific credit cards, coupons and the like. The epsilon interface 160a and sigma interface 160b, as above, may include custom scripts (ETS/LTS scripts) used to unit test the products.

The POSCache interface 160c may communicate directly with a pin pad 170c and may receive commands from the POS terminals 106, 120 and ICR 130, the epsilon interface 160a and the sigma interface 160b for prompting and messaging. The POSCache interface 160c may also be part of the EPS 160 on the EPC 140 or in the system where the POS terminals 106, 120/ICR 130 reside. The POSCache interface 160c may communicate with various pinpads and receive commands from POS terminals 106, 120 and ICR 130, the epsilon interface 160a and sigma interface 160b for prompting and messaging. The POSCache interface 160c may communicate with pinpad models provided by Verifone, Equinox and Ingenico, for example. One or more of the pinpad models 170c may be located in, for example, the store 110.

As above, a developer for the POS terminals/ICR previously had to write entire separate interfaces: Epsilon (Credit/Debit), Sigma (Loyalty) and POSCache (Pinpad control). These interfaces may differ in protocols and programming language, potentially causing interoperability and updating issues, as well as issues with product testing. Specifically, the POS terminals/ICR typically used an Epsilon Software Development Kit (SDK) that helps administrators edit the development system on a specific platform. The Epsilon SDK was written, for example, in C++ for the Microsoft Windows platform.

The implementation of the PMI 150*a* may allow developers enhanced flexibility and permit the SDK to be independent of large operating systems. In some embodiments, developers may implement the PMI 150*a* in eXtensible Markup Language (XML). The PMI 150*a* may leverage Java Architecture for XML Binding (JAXB), which allows Java developers to map Java classes to XML representations, to accept messages from multiple POS terminals (which can be of different types). JAXB may permit storing and retrieving data in memory in any XML format, without implementation in a specific set of XML loading and saving routines for the class structure of the program.

The use of the PMI 150*a* may further allow the POS terminals/ICR developers to implement logic to eliminate issues with communications of XML requests between the PMI 150*a* and the POS terminals/ICR. For example, a store-point POS solution may use an epsilon link server as an intermediary between the PMI 150*a* and the POS terminals/ICR, which may be external to the store. Hence, when different POS/ICR solutions are used, a separate intermediary may be implemented to handle XML requests to, and responses from, the PMI 150*a*. Unfortunately, this may lead to a number of issues if the PMI is not implemented properly. It may also result in more assistance from a remote development team due to lack of a proper implementation guide for the disparate solutions, increasing the development effort to integrate to the product. Furthermore, installation of multiple different packages (Epsilon, Sigma, POSCache, PMI) may be inconvenient and time consuming. Moreover, for development and quality assessment, testing the payments services may be performed by applying either product specific simulators like POSSimulator or custom scripts called ETS scripts or LTS scripts to unit test the implemented solutions. This may not be a reliable way of testing, however.

To alleviate these issues, in the system 100, the PMI 150*a* is modified to act as a Payments API server 150 and exposes different sets of APIs. Thus, interactions between individual APIs can be enabled or disabled by a controller of the Payments API server 150. The APIs can interact with one or more of each of the payment hosts 170*a*, loyalty hosts 170*c* and pinpads 170*c*. The PMI 150*a* of the payments API server 150 may thus use a standard language-independent interface (i.e., not tied to a particular language, such as C++) to unify the different software products (epsilon interface 160*a*, sigma interface 160*b* and POSCache interface 160*c*). The unified package may provide a better and standard interface that developers can use to integrate with product offerings (e.g., POS terminals). The unified package may also enable developers to alleviate the problem of creating custom simulators for testing products and reduce development effort to integrate. In particular, the PMI 150*a* of the payments API server 150 shown in FIG. 1 may also be adapted to accept a stateless communication protocol such as HyperText Transfer Protocol (HTTP) requests and provide HTTP responses instead of POS developers implementing the services to interact with the PMI 150*a*.

The payments API server 150 shown in FIG. 1 may leverage implementations based on Java API for Representational State Transfer (REST)ful Web Services (JAX-RS) to provide RESTful web services. REST is an architectural style that specifies constraints, which, if applied to a web service, induces desirable properties that enable services to work best on the Web. The constraints may be, for example, a uniform interface, while the desirable properties may include, for example, performance, scalability, and modifiability. Resources are accessed using Uniform Resource Identifiers (URIs). The REST architectural style constrains an architecture to a client/server architecture and uses HTTP or other similar protocol. The clients and servers use a standardized interface and protocol to exchange representations of resources. A RESTful web service thus exposes a set of resources that identify the targets of the interaction with its clients.

RESTful resources are manipulated using operations that include: PUT, GET, POST, and DELETE. PUT creates a new resource, which can be then deleted by using DELETE. GET retrieves the current state of a resource in some representation. POST transfers a new state onto a resource. RESTful resources are decoupled from their representation so that their content can be accessed in a variety of formats, such as HTML, XML, plain text, PDF, JPEG, JSON, and others. Metadata about the resource is used, for example, to perform authentication, detect transmission errors, and negotiate the representation format (on the local device), among others. Every interaction with a resource is stateless; that is, request messages are self-contained. Stateful interactions are based on the concept of explicit state transfer, which may occur when, for example, cookies are used. State can be embedded in response messages to point to valid future states of the interaction.

The use of RESTful web services by the payments API server 150 may enable an API reference guide to be provided that allows developers to integrate with payments services. Furthermore, client dependency on a team that provides the payments API server 150 may be avoided, resulting in fewer interactions with the team. Instead, interactions to adjust the payments API server 150 may be made via web-based POS solutions. This permits pretested payments solutions to be provided via the provided APIs. A single software package may be used to install all of the interfaces, or the services may be packaged independently as desired. For example, if a solution to communicate only with different pinpads is desired, the APIs used to communicate to the POSCache interface 160*c* (which in-turn communicates to the pinpads) may be exposed. The payments API server 150 can be deployed local to the transaction (e.g., within the store 110) or may be remote. When eCommerce solutions are to be provided (e.g., as provided from the PC 102), the payments API server 150 may be used as an online payment gateway by installing the payments API server 150 in a cloud server.

Testing of a particular solution offered via specific simulators such as POSSimulator or writing scripts may also be avoided in lieu of a universal API to provide testing. For example, standard tools like Postman may be leveraged to test the solution in a reliable standard way by sending the HTTP requests and ensuring that the correct response is obtained. The scope of automated unit testing can thus be enhanced.

Figure 2:
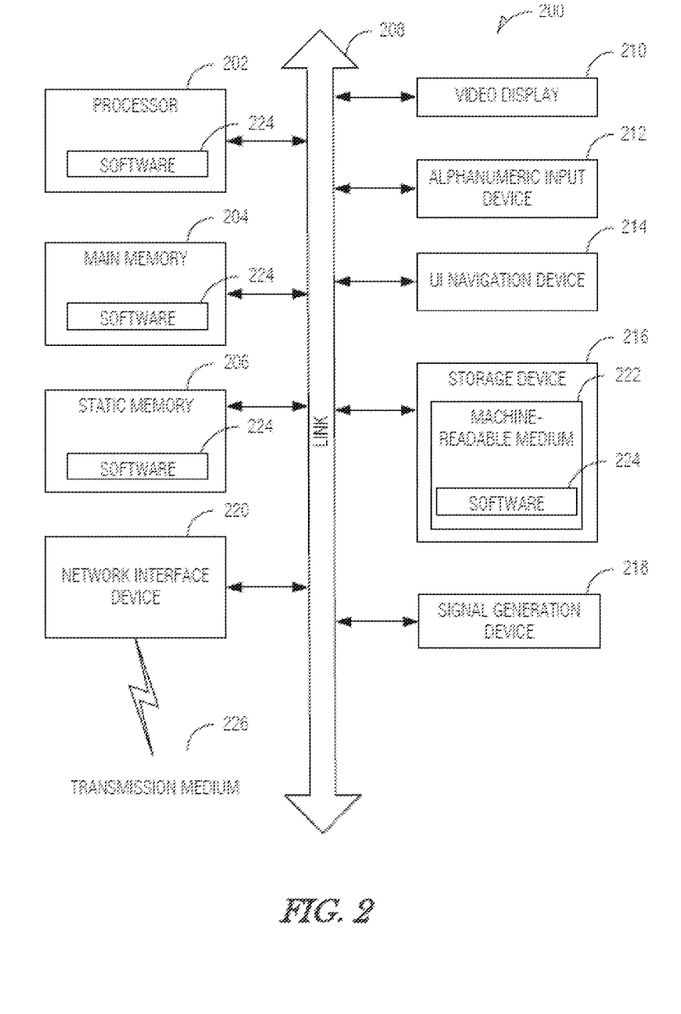
FIG. 2 illustrates a functional block diagram of a POS terminal in accordance with an embodiment.

FIG. 2 illustrates a block diagram of the POS terminal in accordance with some embodiments. In some embodiments the machine may be a computer configured to perform any one or more of the techniques during transaction events discussed herein. In alternative embodiments, the POS terminal 200 may operate as a standalone device or may be connected (e.g., networked) to other computers. In a networked deployment, the POS terminal 200 may operate in the capacity of a server, a client, or both in server-client network environments. In an example, the POS terminal 200 may act as a peer machine in peer-to-peer (P2P) (or other distributed) network environment. The POS terminal 200 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

POS terminal 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. Although not shown, the main memory 204 may contain any or all of removable storage and non-removable storage, volatile memory or non-volatile memory. The POS terminal 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The POS terminal 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The POS terminal 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the POS terminal 200. In an example, one or any combination of the hardware processor 202, the main memory 204, the static memory 206, or the storage device 216 may constitute machine readable media.

While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the POS terminal 200 and that cause the POS terminal 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226.

Figure 3:
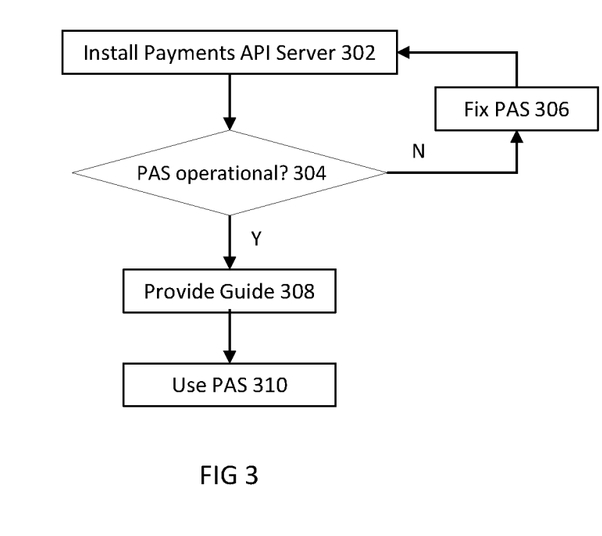
FIG. 3 illustrates a flowchart of a method of providing payments API service in accordance with some embodiments.

FIG. 3 illustrates a flowchart of a method of providing payments API service in accordance with some embodiments. The flowchart may use the implementations shown in FIGS. 1 and 2. At step 302, the payments API service is installed on a payments API server, which may be in an EPC or in a remote location from the EPC. The payments API server may contain a PMI with multiple APIs configured to expose different interfaces to different hosts for a transaction. A single package may be installed that integrates and exposes all of the interfaces using a language independent interface. The APIs may be RESTful APIs that are able to be accessed by a standard interface and may be accessible, like transactions on the payments API server, via HTTP commands. At step 304, the payments API server may be tested using generic testing tools, such as PostMan or web automation tools to determine whether the payments API server is fully operational to interact with the hosts from a variety of inputs. If the payments API server fails in testing, the software package may be updated to resolve the issues and the APIs updated at step 306, before being reinstalled at step 302. If the payments API server completes the testing and passes, an electronic (or paper) guide may be provided to clients/users at step 308. The payments API server may then be put into use for transactions, for example, at a store or other location, at step 310.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 1507 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of providing interactions with multiple different hosts, the method comprising:
    installing Application Programming Interfaces (APIs) in a common messaging interface on a payments API server in a dedicated controller, the APIs configured to interact with payment hosts, loyalty hosts and pinpads, the loyalty hosts configured to provide loyalty rewards to a user for at least one of use of a particular transactional device or for a transaction involving a particular store or item, the common messaging interface being a Payment Messaging Interface (PMI);
    receiving HyperText Transfer Protocol (HTTP) requests from point of sale (POS) terminals, Island Card Readers (ICRs) and computers at the payments API server;
    in response to receiving an HTTP request from one of the POS terminals, ICRs or computers, handling, by the dedicated controller, interactions associated with eXtensible Markup Language (XML) requests to, and responses from, the PMI and using an appropriate one of the APIs to interact with at least one of the payment hosts, loyalty hosts, or a POS cache interface of a POS terminal to communicate with the pinpads, wherein handling further includes directing at least one response to a particular POS cache interface of a particular POS terminal to communicate with a particular pinpad; and
    after interacting with the at least one of the payment hosts, loyalty hosts or pinpads, providing an HTTP response to the one of the POS terminals, ICRs or computers based on the interaction.

2. The method of claim 1, wherein the PMI is a standard language-independent interface.

3. The method of claim 2, wherein the APIs in the PMI are Representational State Transfer (REST)ful APIs.

4. The method of claim 3, wherein the APIs in the PMI are associated with an epsilon interface to process transactions and interact with the payment hosts, a sigma interface to process loyalty transactions and interact with the loyalty hosts, and a POSCache interface to interact with the pinpads.

5. The method of claim 4, further comprising:
    receiving test HTTP requests to test the APIs prior to receiving the HTTP request from the one of the POS terminals, ICRs or computers;
    in response to receiving the test HTTP requests, use the APIs to interact with the payment hosts, loyalty hosts and pinpads;
    determining whether appropriate responses are obtained from the payment hosts, loyalty hosts and pinpads in response to the test HTTP requests; and
    fixing issues with the APIs and reinstalling the APIs in response to determining that at least one response from the payment hosts, loyalty hosts and pinpads is not appropriate.

6. The method of claim 5, wherein:
the test HTTP requests are generated using a web-based automation tool and without the use of a custom simulator.

7. The method of claim 6, wherein:
the payments API server interacts with different payment hosts, loyalty hosts and pinpads using different protocols, and
the method further comprises:
  receiving an indication of particular ones of the payment hosts, loyalty hosts and pinpads with which a customer is to implement services to interact with the PMI; and
  exposing only APIs associated with the particular ones of the payment hosts, loyalty hosts and pinpads to the customer.

8. The method of claim 1, wherein the loyalty hosts are configured to provide loyalty rewards to the user for use of the particular transactional device.

9. The method of claim 1, wherein the payments API server is deployed local to the transaction.

\* \* \* \* \*